(12) United States Patent
Wada et al.

(10) Patent No.: US 10,059,183 B2
(45) Date of Patent: Aug. 28, 2018

(54) ENGINE MOUNT STRUCTURE

(71) Applicant: Kawasaki Jukogyo Kabushiki Kaisha, Kobe-shi, Hyogo (JP)

(72) Inventors: Hiroyuki Wada, Kobe (JP); Takeshi Kashihara, Rayong (TH); Shunichi Hashimoto, Kakogawa (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 53 days.

(21) Appl. No.: 15/244,324

(22) Filed: Aug. 23, 2016

(65) Prior Publication Data

US 2016/0355080 A1 Dec. 8, 2016

Related U.S. Application Data

(63) Continuation of application No. PCT/JP2015/053051, filed on Feb. 4, 2015.

(30) Foreign Application Priority Data

Mar. 19, 2014 (JP) .................................. 2014-056086

(51) Int. Cl.
*B62K 11/04* (2006.01)
*B60K 5/12* (2006.01)
*B62M 7/02* (2006.01)

(52) U.S. Cl.
CPC ............ *B60K 5/1208* (2013.01); *B62K 11/04* (2013.01); *B62M 7/02* (2013.01)

(58) Field of Classification Search
CPC .......... B60K 5/1208; B62K 11/04; B62M 7/02
See application file for complete search history.

(56) References Cited

U.S. PATENT DOCUMENTS 7,490,689 B2  2/2009  Seki et al.
7,644,795 B2  1/2010  Kawamura et al.
(Continued)

FOREIGN PATENT DOCUMENTS

JP  49-004428  2/1974
JP  54-046447  3/1979
(Continued)

OTHER PUBLICATIONS

Extended and Supplementary Search Report dated Oct. 18, 2017 for Corresponding European Patent Application No. 15764534.2 (11 pages).

(Continued)

*Primary Examiner* — Tony H Winner

(57) ABSTRACT

A main frame includes a pair of left and right first frame pieces which extends rearwardly from above an engine, a pair of left and right second frame pieces each extending from a front portion in a direction slantwise downwardly and rearwardly of the associated first frame piece, and a pair of left and right third frame pieces each extending rearwardly from a lower end of the associated second frame piece through laterally of a cylinder block. The first mount section for supporting the front portion of the engine is constituted by a rubber mount in which a pair of left and right support portions, provided at respective joints between the second frame pieces and the third frame pieces, and a pair of first to-be-supported portions are connected together. The support portions are connected together through a connecting member that extends in a leftward and rightward direction.

4 Claims, 3 Drawing Sheets

(56) References Cited

U.S. PATENT DOCUMENTS

2006/0219463 A1* 10/2006 Seki .................. B62K 11/04
  180/311
2006/0283650 A1* 12/2006 Kawamura ............ B62K 11/04
  180/227

FOREIGN PATENT DOCUMENTS

| JP | 05-050969 | 3/1993 |
| JP | 06-016171 | 1/1994 |
| JP | 2003-226284 | 1/2002 |
| JP | 2006-281913 | 10/2006 |
| JP | 2006-347450 | 12/2006 |
| JP | 2013-133026 | 7/2013 |
| JP | 2013-252831 | 12/2013 |

OTHER PUBLICATIONS

International Preliminary Report on Patentability in PCT/JP2015/053051; dated Sep. 29, 2016; 10 pages.
Notification of Reason(s) for Rejection dated Aug. 29, 2017 for Corresponding Japanese Patent Application No. 2014-056086 with English Language Summary (5 pages).
International Search Report with English Language Translation for PCT/JP2015/053051, 4 pages.

* cited by examiner

ENGINE MOUNT STRUCTURE

CROSS REFERENCE TO THE RELATED APPLICATION

This application is a continuation application, under 35 U.S.C § 111(a) of international patent application No. PCT/JP2015/053051, filed Feb. 4, 2015, which claims priority to Japanese patent application No. 2014-056086, filed Mar. 19, 2014, the entire disclosure of which is herein incorporated by reference as a part of this application.

BACKGROUND OF THE INVENTION

Field of the Invention

The present invention relates to an engine mount structure for supporting a combustion engine on a vehicle frame structure of the motorcycle.

Description of Related Art

The combustion engine generally used in the motorcycles is mounted on a vehicle frame structure by three mount sections including, for example, a front portion of the combustion engine, a rear upper portion thereof and a rear lower portion thereof. In this motorcycle, it has been known that during the traveling, vibrations induced by the combustion engine are transmitted to the vehicle frame structure enough to oscillate the vehicle body. Accordingly, the use has been made of rubber vibration isolators in and at each of those three mount sections to suppress transmission of the engine induced vibrations to the vehicle frame structure. See, for example, the patent document 1 listed below.

PRIOR ART DOCUMENT

Patent Document 1: JP Laid-open Patent Publication No. H06-016171

The vehicle frame structure disclosed in the above mentioned patent document 1 is a frame structure generally called the cradle frame type, in which the combustion engine is encompassed from above and bottom by a frame member, and is generally considered having a sufficient strength. It is, however, been found that in the vehicle frame structure such as a so-called diamond frame type, in which the use of a down tube present beneath the combustion engine is dispensed with and the combustion engine itself is utilized as an element that attributes to a part of the frame strength, the strength of the frame structure tends to be reduced if a rubber vibration isolator is installed in a mount section on the front side of the engine.

SUMMARY OF THE INVENTION

In view of the foregoing, it is an object of the present invention to provide a mount structure for an engine, which is effective to prevent the engine vibrations from being transmitted to the frame structure and also to avoid an undesirable reduction of the strength of the frame structure.

In order to accomplish the foregoing object, the present invention is so designed as to provide an engine mount structure for supporting an engine on a vehicle frame structure of the motorcycle, in which: the vehicle frame structure includes a main frame extending rearwardly and slantwise downwardly from a head pipe; the engine includes a crankcase to support a crankshaft and a cylinder block connected with an upper portion of the crankcase and is supported on the main frame at three locations including a front portion, a rear upper portion and a rear lower portion thereof; the main frame includes a pair of left and right first frame pieces both extending from upwardly of the engine in a direction rearwardly of the engine, a pair of left and right second frame pieces each extending from a front portion the associated first frame piece in a direction slantwise downwardly, and a pair of left and right third frame pieces each extending in a rearward direction from a lower end of the corresponding second frame piece through laterally of the cylinder block and connected with an intermediate portion of the associated first frame piece. The mount structure includes: a first mount section to support a front portion of the engine being constituted by a rubber mount which includes a pair of left and right support portions provided at a joint between the second frame piece and the third frame piece and left and right to-be-supported portions each provided in the engine, the respective support portion being connected with the associated to-be-supported portion through an elastic member; and a connecting member configured to connect the left and right support portions with each other.

According to the above described construction, since the first mount section to support the front portion of the engine is employed in the form of the rubber mount, transmission of engine vibrations to the frame can be prevented. In particular, since the first mount section is provided at a location close to the head pipe, the use of the rubber mount for the first mount section is effective to suppress transmission of the vibrations to the arm of the rider from the main frame through the head pipe, resulting in the increase of the riding quality. Moreover, since the left and right joints are connected with each other by means of the connecting member, a sufficient frame strength can be secured even though the first mount section is employed in the form of the rubber mount.

In the practice of a preferred embodiment of the present invention, the cylinder block may include a cylinder accommodating a piston and a cylinder head above the cylinder, and the cylinder is supported by the main frame by the first mount section. According to this construction, when the front portion of the cylinder, which is lower in temperature than the cylinder head, is supported by the first mount section, it is easy to secure the frame strength.

In the practice of another preferred embodiment of the present invention, the engine support structure may include a second mount section to support the rear upper portion of the engine, and the second mount section is constituted by a rubber mount having an elastic member interposed. According to this construction, the second mount section close to the rider's seat is employed in the form of the rubber mount, transmission of the engine vibrations to the rider can be prevented and, as a result, the riding quality or comfortability can be increased.

In a further preferred embodiment of the present invention, the engine mount structure may also include a third mount section to support the rear lower portion of the engine, the third mount section is a rigid mount having no elastic member intervened. According to this construction, when the third mount section in the vicinity of an output sprocket is rendered to be rigid, undesirable jolting of the output sprocket can be prevented and, as a result, the operation of a chain, belt or the like can be stabilized.

In the practice of a still further preferred embodiment of the present invention, the engine support structure further includes a bracket to support the engine, and the bracket is connected with the joint, in which case the support portions of the first mount section are positioned beneath the joint in the bracket. According to this construction, without the second frame piece extending considerably in a downward direction, the front portion of the cylinder, which is lower in temperature than that of the cylinder head, can be supported by the first section.

In the practice of a yet further preferred embodiment of the present invention, the second mount section to support the rear upper portion of the engine and the third mount section to support the rear lower portion of the engine may be provided in a swingarm bracket formed in the main frame. According to this construction, by supporting the engine on the swingarm bracket having a high strength, the engine can be stably supported.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
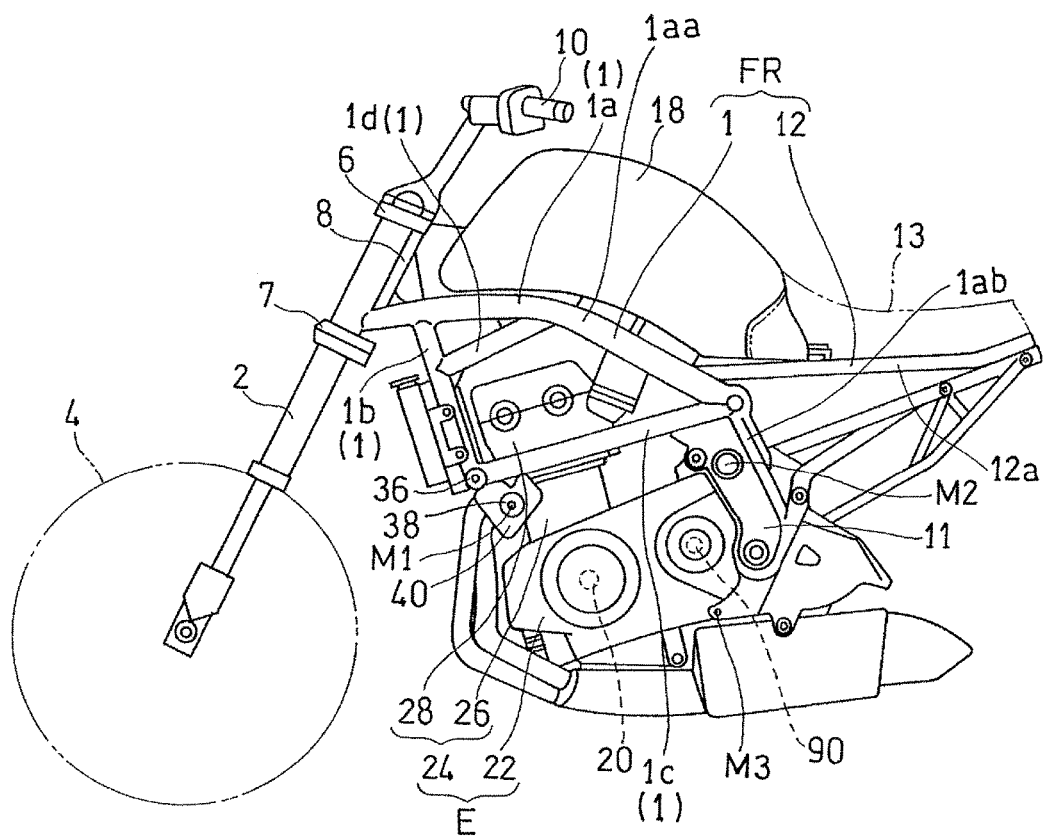
FIG. 1 is a side view showing a front portion of a motorcycle utilizing an engine mount structure designed in accordance with a preferred embodiment of the present invention.

Hereinafter, a preferred embodiment of the present invention will be described in detail with particular reference to the accompanying drawings. In describing the present invention, however, the terms "left and right" used hereinabove and hereinafter are to be understood as relative terms descriptive of positions and/or directions taken with respect to a rider seated on a motorcycle. Referring first to FIG. 1, the motorcycle shown includes a main frame 1 forming a front half portion of the vehicle frame structure FR. A front fork 2 is supported at a front end of the main frame 1, and a front wheel 4 is supported at a lower end portion of the front fork 2. The front fork 2 is pivotally supported by a head pipe 8 at the front end of the main frame 1 together with an upper bracket 6 and a lower bracket 7 both cooperating to support the front fork 2, and a handlebar 10 is fitted to the upper bracket 6.

On the other hand, the main frame 1 has a rear end lower portion to which a swingarm bracket 11 is secured, and a swingarm for supporting a rear wheel (not shown) is pivot- ally supported by the swingarm bracket 11. The main frame 1 also has an intermediate lower portion on which a combustion engine E, which is a prime mover for driving the rear wheel, is supported. The combustion engine E includes a crankcase 22 for supporting a crankshaft 20 and a cylinder block 24 coupled with an upper portion of the crankcase 22. The cylinder block 24 includes a cylinder 26, accommodating a reciprocating piston (not shown) therein, and a cylinder head 28 situated above the cylinder 26.

A rear frame 12 forming a rear half portion of the vehicle frame structure FR is connected with a rear portion of the main frame 1. On a seat rain 12a forming an upper portion of the rear frame 12, a rider's seat 13 and a fellow passenger's seat (not shown) situated rearwardly thereof are supported. The main frame 1 has an upper portion on which a fuel tank 18, having been positioned between the head pipe 8 and the rider's seat 13, is mounted.

Figure 2:
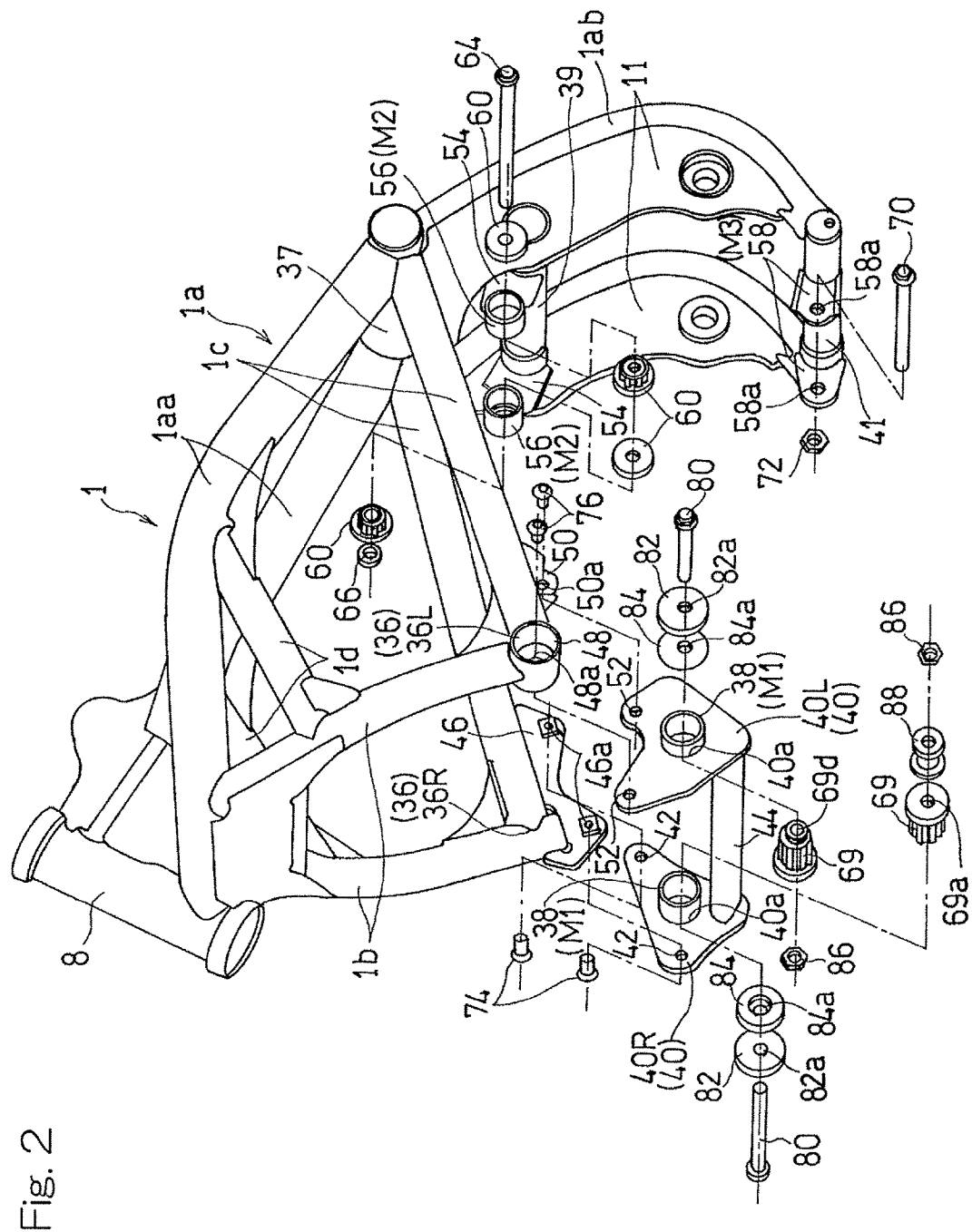
FIG. 2 is a perspective view showing a main frame used in the motorcycle.

The main frame 1 referred to above extends in a direction generally rearwardly and slantwise downwardly from the head pipe 8. As shown in FIG. 2, the main frame 1 includes a pair of first left and right frame pieces 1a extending from above the combustion engine E in a direction rearwardly of the engine E and then bent so as to extend downwardly, second left and right frame pieces 1b extending from respective front portions of the first frame pieces 1a in a direction rearwardly and slantwise downwardly, and third left and right frame pieces 1c extending from respective lower ends of the second frame pieces 1b in a direction rearwardly and then passing laterally outwardly of the cylinder block 24.

Each of the first frame pieces 1a includes a first frame piece front half portion 1aa, extending from above the combustion engine in a direction rearwardly of the engine E, and a first frame piece rear half portion 1ab connected with a rear end of the first frame piece front half portion 1aa so as to extend downwardly. The swingarm bracket 11 referred to above is secured by welding to a portion ranging from a joint between the third frame piece 1c and the first frame piece rear half portion 1ab to a lower part of that first frame piece rear half portion 1ab. Each of the third frame pieces 1c has a front end that is connected with a lower end of the associated second frame piece 1b through a joint 36 (left and right joints 36L and 36R). Each of the third frame pieces 1c has a rear end connected with a joint that is defined between the associated first frame piece front half portion 1aa and the adjacent first frame piece rear half portion 1ab.

Fourth frame pieces 1d are disposed each between the first frame piece front half portion 1aa of the first frame piece 1a and the second frame piece 1b so as to straddle therebetween. Respective intermediate portions of the first frame pieces 1a, specifically, respective portions of the first frame pieces 1a that are connected with associated rear ends of the third frame pieces 1c, are connected with each other through a first cross pipe 37 extending in a leftward and rightward direction or vehicle widthwise direction. Respective upper portions of the left and right swingarm brackets 11 and 11 are connected with each other through a second cross pipe 39. Respective lower ends of the first frame pieces 1a are connected with each other through a third cross pipe 41. The above described connections of first to third frame pieces 1a, 1b, 1c, the fourth frame pieces 1d and the first to third cross pipes 37, 39, 41 are all made by the use of any known welding technique.

The right joint 36R formed in the main frame 1 has a first mounting piece 46 in the form of a plate member secured thereto by means of welding. Two thread holes 46a are formed in the first mounting piece 46. In the practice of the embodiment now under discussion, those thread holes 46a are formed in the form of welded nuts. On the other hand, the left joint 36L is defined by a cylindrical blind pipe 48, and a bolt insertion hole 48a is defined in a bottom portion of the cylindrical blind pipe 48. In the vicinity of the left joint 36L, a second mounting piece 50 in the form of a plate member is secured to the left fourth frame piece by welding, and a single bolt insertion hole 50a is formed in the second mounting piece 50.

The combustion engine E shown in FIG. 1 is supported by the main frame 1 at three points that are respectively represented by a front portion of the engine E, a rear upper portion of the engine E and a rear lower portion of the engine E. More specifically, the main frame 1 has defined therein a first mount section M1 for supporting the front portion of the combustion engine E, a second mount section M2 for supporting the rear upper portion of the combustion engine E, and a third mount section M3 for supporting the rear lower portion of the combustion engine E. Of those mount sections M1 to M3, the first and second mount sections M1 and M2 are provided with first and second dampers 69 and 60 for vibration suppression purpose as will be detained late, as shown in FIG. 2. The vehicle frame structure FR shown in FIG. 1 is of a structure in which the use of a down tube positioned beneath the combustion engine E is dispensed with and, instead, the combustion engine E itself is used as an element which attributes to a part of the frame strength.

The first mount section M1 is defined by a pair of left and right support members 38 an 38 that are provided at the respective joints 36 each between the second frame piece 1b and the third frame piece 1c. More specifically, a pair of left and right engine brackets 40 are connected with the respective joints 36, and the support members 38 forming the first mount section M1 are formed in the respective engine brackets 40. In other words, the support members 38 are positioned beneath the associated joints 36. The engine cylinder 26 is supported by those first mount section M1.

Each of the engine brackets 40 and 40 shown in FIG. 2 is employed in the form of a plate member made of a metallic material. The cylindrical metal pipe 38 is inserted into and welded to a throughhole 40a defined in a center portion of the corresponding engine bracket 40. The metal pipe 38 referred to above forms the corresponding support member 38 discussed above. The left and right engine brackets 40L and 40R are connected with each other through a connecting member 44 that extends in the vehicle widthwise direction. The connecting member 44 is in the form of a pipe made of a metallic material, and has its left and right, opposite ends secured to respective inner faces of the engine brackets 40L and 40R. This connecting member 44 is positioned below the support members 38.

Two bolt insertion holes 42 are formed in an upper portion of the right engine bracket 40R. Those bolt insertion holes 42 are defined at respective locations where the bolt insertion holes 42 can be aligned with the thread holes 46a defined in the first mounting piece 46.

Similarly, two thread holes 52 are defined in an upper portion of the left engine bracket 40L. In the practice of the embodiment now under discussion, the thread holes 52 are formed in the form of welded nuts (not shown). Those thread holes 52 are positioned at respective locations where the thread holes 52 can be aligned respectively with the bolt insertion hole 50a, defined in the second mounting piece 50, and the bolt insertion hole 48a defined in the bottom wall of the cylindrical pipe 48.

The second mount section M2 is provided in the swingarm bracket 11. More specifically, the second cross pipe 39 is connected with cylindrical pipes 56 through a third mounting piece 54, and those cylindrical pipes 56 cooperate with each other to form the second mount section M2. The cylindrical pipes 56 have respective shaft axes oriented in the vehicle widthwise direction and are disposed in the vehicle widthwise direction in alignment with each other. The crankcase 22 discussed hereinbefore (best shown in FIG. 1) has a rear upper portion supported at and by this second mount section M2.

The third mount section M3 is provided in respective lower ends of the first frame piece 1a. More specifically, mounting members 58 each in the form of a plate member are connected with the third cross pipe 41 so as to protrude forwardly. Those mounting members 58 cooperate with each other to form the third mount section M3. Those mounting members 58 have corresponding bolt insertion holes 58a defined therein so as to be oriented in the vehicle widthwise direction and are provided two in number along the vehicle widthwise direction. The third mount section M3 of the structure referred to above is used to support a rear lower portion of the crankcase 22 shown in FIG. 1.

Figure 4:
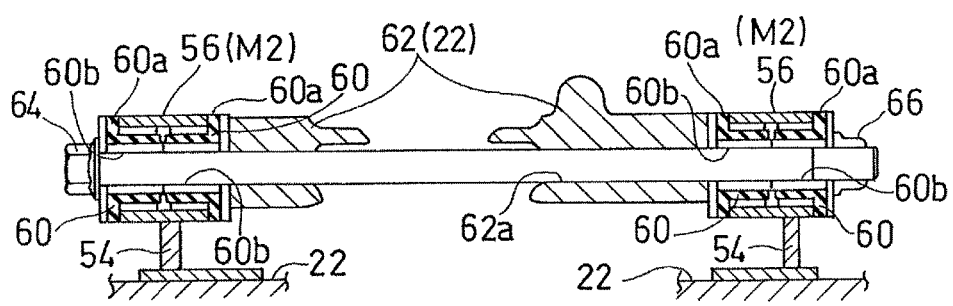
FIG. 4 is a sectional view showing a second mount section in the main frame.

The manner of mounting the combustion engine will now be described. At the outset, the four second dampers 60, each in the form of an elastic member made of, for example, rubber, are inserted into the cylindrical pipes 56 of the second mount section M2. Each of the second dampers 60 is of a cylindrical shape having a collar 60a on one side thereof, and the two second dampers 60 can be inserted into the single cylindrical pipe 56, one from left and the other from right in respective directions opposite to each other. As best shown in FIG. 4, the collar 60a of each of the second dampers 60 is brought into contact with or opposed to respective end faces of the cylindrical pipe 56.

Subsequently, a second to-be-supported portion 62 of the rear upper portion of the crankcase 22 is supported by the second mount section M2. The second to-be-supported portion 62 is positioned between the two cylindrical pipes 56 and is provided with a bolt insertion hole 62a that is oriented in the vehicle widthwise direction. In a condition while the second to-be-supported portion 62 is disposed between the two cylindrical pipes 56 in the second mount section M2, a bolt 64 is inserted from leftwardly of the vehicle body into the interior 60b of the second damper 60 and the bolt insertion hole 62a in the second to-be-supported portion 62, followed by fastening of a nut 66. Thereby, the rear upper portion of the crankcase 22 is supported at and by the second mount section M2.

Figure 5:
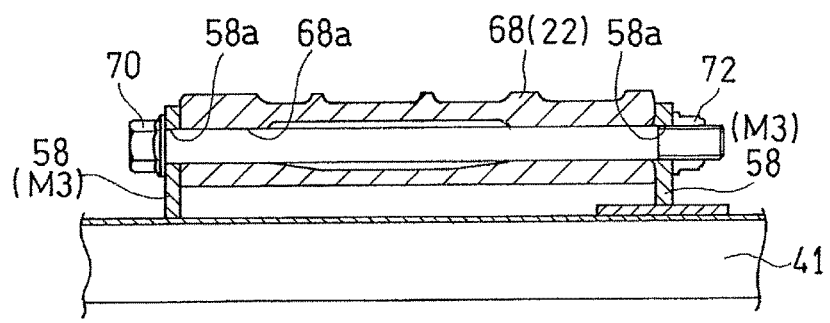
FIG. 5 is a sectional view showing a third mount section in the main frame.

Also, as shown in FIG. 5, in a condition while a third to-be-supported portion 68 of the rear lower portion of the crankcase 22 is disposed between the two mounting members 58 in the third mount section M3, a bolt 70 is inserted from leftwardly of the vehicle body into the bolt insertion hole 58a in each of the mounting members 58 and also into the bolt insertion hole 68a in the third to-be-supported portion 68, followed by fastening of a nut 72. Thereby, the rear lower portion of the crankcase 22 is supported at and by the third mount section M3.

Figure 3:
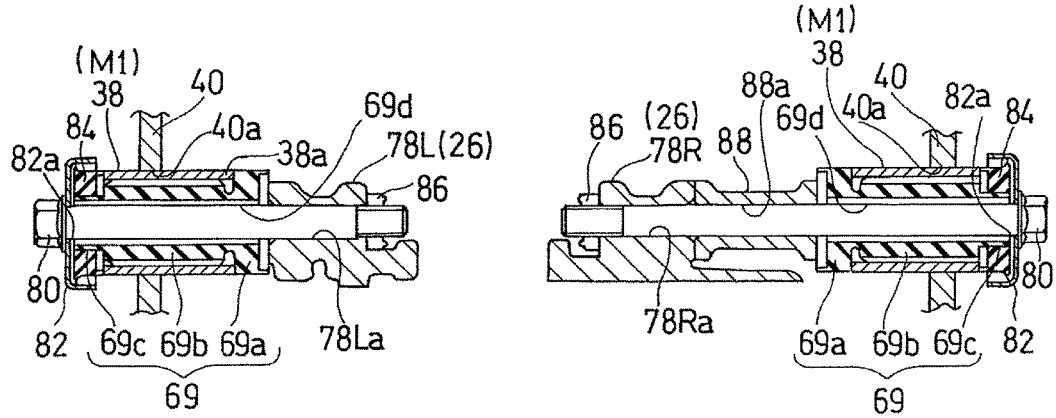
FIG. 3 is a sectional view showing a first mount section in the main frame.

Thereafter, a generally cylindrical first damper 69 in the form of an elastic member made of, for example, rubber, is inserted from inwardly of the vehicle body into left and right support portions 38 in the first mount section M1. As shown in FIG. 3, the first damper 69 includes a large diameter flange portion 69a situated inwardly of the vehicle body, an intermediate portion 69b continued from the flange portion 69a and situated inside the support portion 38, and a reduced diameter protruding portion 69c situated outwardly of the vehicle body. The intermediate portion 69b has an outer diameter equal to the inner diameter of the support portion 38. The flange portion 69a has an outer diameter greater than the inner diameter of the support portion 38, and the flange portion 69a is therefore held in abutment with an end face 38a of the support portion 38. The intermediate portion 69b is, as shown in FIG. 2, formed with a plurality of projections extending axially parallel to the outer periphery of a cylindrical body.

Thereafter, the engine brackets 40 are fitted to the main frame 1 by the use of bolts 74 and 76. Specifically, the bolt 74 is inserted in the bolt insertion hole 42 defined in the right engine bracket 40R and is threadingly engaged into the thread hole 46a defined in the first mounting piece 46. On the other hand, the bolt 76 is inserted in the bolt insertion hole 48a, defined in the cylindrical pipe 48, and the bolt insertion hole 50a defined in the second mounting piece 50 and is subsequently threaded into the thread hole 52 in the left engine bracket 40L.

Further, as shown in FIG. 3, in a condition in which a left and right first to-be-supported portions 78L and 78B formed integrally with the engine cylinder 26 are disposed between the two support portions 38 and 38, an annular elastic washer 84 in the form of an elastic member made of, for example, rubber is mounted on the outer periphery of the protruding portion 69c of the first damper 69, and an annular bowl shaped cap 82 is covered over the elastic washer 84. Subsequently, a bolt 80 is sequentially passed through a center hole 82a in the bowl shaped cap 82, then through a center hole 69d in the first damper 69 and through a bolt insertion hole 78La in the left first to-be-supported portion 78L, with a nut 86 finally fastened thereto. By so doing, the front portion of the engine cylinder 26 is supported on and by the left first mount section M1.

In addition, in the right first mount section M1, in a condition in which a cylindrical collar 88 of a type having flanges on both ends thereof is interposed between the right first to-be-supported portion 78R and the first damper 69, the bolt 80 is sequentially passed through a center hole 82a of the cap 82, through the center hole 69d in the first damper 69 and through a bolt insertion hole 78Ra in the first to-be-supported portion 78R, with the nut 86 finally fastened thereto. By so doing, the front portion of the engine cylinder 26 is supported on and by the right first mount section M1. Finally, the bolts 64, 70, 74, 76 and 80 are fastened with a specified torque. In the way as described above, the combustion engine E shown in FIG. 1 is mounted on the main frame 1.

As shown in FIG. 3, the first mount section M1 is constituted by a rubber mount in which the left and right support portions 38, 38 and the left and right to-be-supported portions 78L, 78R provided in the engine cylinder 26 are connected with each other through the first damper 69.

Referring to FIG. 4, the second mount section M2 is constituted by a rubber mount in which the second damper 60 is interposed between the left and right cylindrical pipe 56, 56 and the left and right second to-be-supported portions 62, 62 provided in the crankcase 22.

As shown in FIG. 5, the third mount section M3 is constituted by a rigid mount with no elastic member intervened between the mounting member 58 and the crankcase 22.

According to the construction so described hereinabove described, since the first mount section M1 for supporting the front portion of the combustion engine E shown in FIG. 1 is constituted by the rubber mount, it is possible to avoid an undesirable transmission of vibrations of the combustion engine E to the main frame 1. In particular, since the first mount section M1 is close to the handlebar 10, the use of the rubber mount for the first mount section M1 is effective to suppress transmission of the vibrations from the main frame 1 to the arms of the rider through the handlebar 10, resulting in the increase of the riding quality or comfortability. In addition, since the left and right joints 36 and 36 are connected with each other through the connecting member 44, a sufficiently required frame strength can be secured despite of the use of the rubber mount.

Again, since the engine cylinder 26 of a temperature lower than the cylinder head 28 shown in FIG. 1 is supported on the main frame 1 through the first mount section M1, the strength of the main frame 1 can be easily obtained.

Further, since the second mount section M2, which is close to the rider's seat 13, is also constituted by the rubber mount, the vibrations of the combustion engine E can be prevented from being transmitted to the rider through the rider's seat 13 and, as a result, the ride quality or comfortability increases.

The third mount region M3 close to an output sprocket 90 is constituted by a rigid mount with no elastic member intervened. Therefore, jolting of the output sprocket 90 can be avoided and, as a result, a chain or a belt or the like (both not shown) that is connected with the output sprocket 90 can be stabilized.

Furthermore, the engine bracket 40 is connected with the joint 36, and the support portion 38 forming a part of the first mount section M1 is positioned beneath the joint 36 in the engine bracket 40. Accordingly, the front portion of the engine cylinder 26, which is lower in temperature than that of the cylinder head 28, can be supported with no need to use the second frame piece 1b that is extended considerably in a downward direction.

In addition, since the second mount section M2 is provided in the swingarm bracket 11 having a high strength, the combustion engine E can be stably supported.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Although in describing the preferred embodiment of the present invention as set forth hereinabove, the first and second mount sections M1 and M2 have been shown and described as constituted by the rubber mounts, the present invention can work satisfactorily if only the first mount section M1 is in the form of the rubber mount, in which case the second and third mount sections M2 and M3 may be employed each in the form of either the rubber mount or the rigid mount.

Also, a front portion of the crankcase 22 may be supported by the first mount section M1. Yet, the third mount section M3 may also be provided in the swingarm bracket 11.

Accordingly, such changes and modifications are, unless they depart from the scope of the present invention as delivered from the claims annexed hereto, to be construed as included therein.

REFERENCE NUMERALS

1 . . . Main frame
1a . . . First frame piece
1b . . . Second frame piece
1c . . . Third frame piece
8 . . . Head pipe 11 . . . Swingarm bracket
22 . . . Crankcase
24 . . . Cylinder block
36 . . . Joint
38 . . . Support portion
40 . . . Engine bracket
44 . . . Connecting member
69 . . . First damper (Elastic member)
78L, 78R . . . First to-be-supported portion
E . . . Combustion engine
FR . . . Vehicle frame structure
M1 . . . First mount section
M2 . . . Second mount section
M3 . . . Third mount section

What is claimed is:

1. An engine mount structure to support an engine on a vehicle frame structure for a motorcycle, in which:
   the vehicle frame structure includes a main frame extending rearwardly and slantwise downwardly from a head pipe;
   the engine includes a crankcase to support a crankshaft and a cylinder block connected above the crankcase, the cylinder block comprising a cylinder accommodating a piston and a cylinder head above the cylinder, the engine being supported on the main frame at three locations including a front portion, a rear upper portion and a rear lower portion thereof; and
   the main frame includes a pair of left and right first frame pieces both extending from upwardly of the engine in a direction rearwardly of the engine, a pair of left and right second frame pieces each extending from a front portion of the associated first frame piece in a direction slantwise downwardly, and a pair of left and right third frame pieces each extending in a rearward direction from a lower end of the corresponding second frame piece through laterally of the cylinder block and connected with an intermediate portion of the associated first frame piece,
   the mount structure comprising:
   a first mount section to support a front portion of the cylinder, the first mount section being constituted by a rubber mount which includes a pair of left and right support portions provided at a left and right joint between the second frame piece and the third frame piece and left and right to-be-supported portions each provided in the engine, the respective support portion being connected with the associated to-be-supported portion through an elastic member;
   a connecting member configured to connect the left and right support portions with each other; and
   left and right brackets to support the engine, the left and right brackets being connected with the left and right joints, respectively, the left and right brackets being connected with each other via the connecting member, wherein
   the left and right support portions of the first mount section are positioned beneath the left and right joint in the left and right bracket, respectively.

2. The engine mount structure as claimed in claim 1, further comprising a second mount section to support the rear upper portion of the engine, the second mount section being constituted by a rubber mount having an elastic member interposed.

3. The engine mount structure as claimed in claim 1, further comprising a third mount section to support the rear lower portion of the engine, the third mount section being constituted by a rigid mount having no elastic member interposed.

4. The engine mount structure as claimed in claim 1, further comprising:
   a second mount section to support the rear upper portion of the engine; and
   a third mount section to support the rear lower portion of the engine, wherein
   the second and third mount sections are provided in a swingarm bracket formed in the main frame.

* * * * *